(12) United States Patent
Simpson et al.

(10) Patent No.: US 8,135,864 B2
(45) Date of Patent: Mar. 13, 2012

(54) MECHANISM FOR SHARING WEB BASED IMAGING INFORMATION FROM A UNIX TERMINAL COMPUTING ENVIRONMENT

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2141 days.

(21) Appl. No.: 10/255,382

(22) Filed: Sep. 26, 2002

(65) Prior Publication Data

US 2004/0073632 A1    Apr. 15, 2004

(51) Int. Cl.
*G06F 15/16* (2006.01)
*G06F 17/00* (2006.01)
(52) U.S. Cl. ........................................ 709/248; 715/274
(58) Field of Classification Search .................. 715/527, 715/274; 709/248
See application file for complete search history.

(56) References Cited

U.S. PATENT DOCUMENTS

| 5,956,487 | A  | * | 9/1999 | Venkatraman et al. | 709/218 |
| 6,628,415 | B2 | * | 9/2003 | Lawrence et al. | 358/1.15 |
| 6,714,964 | B1 | * | 3/2004 | Stewart et al. | 709/203 |
| 2002/0010720 | A1 | * | 1/2002 | Long et al. | 707/527 |
| 2002/0138564 | A1 | * | 9/2002 | Treptow et al. | 709/203 |

OTHER PUBLICATIONS

Flynn et al., The Satchel system architecture: Mobile access to documents and services, Dec. 2000, Baltzer Science publishers BV, ISSN: 1383-469X, pp. 247 and 250.*

* cited by examiner

*Primary Examiner* — Peling Shaw

(57) ABSTRACT

The method of the present invention is capable of providing distributed imaging capability to a user of a computing device within a UNIX printing environment. Document creation, manipulation, editing, and output are provided by the present invention. Document design and image data are associated with the originating user. Generic access instructions cause associated document data to be retrieved or stored in accordance with the present invention. Multiple documents and output devices may be employed to accomplish the requesting user's needs. Further, interactive graphical printing configuration and monitoring may be utilized.

10 Claims, 11 Drawing Sheets

MECHANISM FOR SHARING WEB BASED IMAGING INFORMATION FROM A UNIX TERMINAL COMPUTING ENVIRONMENT

FIELD OF THE INVENTION

The present invention relates to a distributed environment for image processing. More specifically, the present invention relates to apparatus and methods for sharing imaging information between web-based services and devices.

BACKGROUND OF THE INVENTION

The Internet is a well-known, global network of cooperatively interconnected computer networks. The World Wide Web portion of the Internet is a collection of server computers (referred to as "web sites") on the Internet, which store documents that can be publicly accessed by computer users having a connection to the Internet.

World Wide Web ("web") is used herein to refer generally to both (i) a distributed collection of interlinked, user-viewable documents (commonly referred to as web documents or web pages) that are accessible via the Internet, and (ii) the client and server software components which provide user access to such documents using standardized Internet protocols. Currently, the primary standard protocol for allowing applications to locate and acquire web documents is Hyper Text Transfer Protocol (HTTP), and the web pages are typically encoded using Hyper Text Markup Language (HTML). However, the terms "web" and "World Wide Web" are intended to encompass other markup languages and transport protocols that may be used in place of (or in addition to) HTML and HTTP.

A user at an individual web-based device (e.g., a workstation) may access a web page on the Internet using a graphical user interface software application known as a "web browser." A variety of commercial web browsers are currently available. Well-known web browsers include Netscape's Navigator® and Microsoft's Internet Explorer®. Web browsers function to initiate connections via the Internet to responsive computers known as "web servers," and to receive information from the web servers that is displayed on the user's workstation.

Typically, "clients" are applications that run on workstations and rely on servers to perform certain operations. For example, an e-mail client is an application that enables a workstation to send and receive e-mail via a local area network (LAN) server and an e-mail server. The term "server" is thus used herein to denote a linked computing device or group of such devices acting as a single unit to provide centralized services to one or more workstations. Clients may rely on servers for any number of functions, including interconnection with other devices, web access, resources (such as database storage of files), and, in some cases, processing power. Web servers respond to a web browser's request by transmitting a web page, or other types of web content. Web content, as used herein, is a set of executable instructions a server serves to a client and which is intended to be executed by the client so as to provide the client with certain functionality.

Given the advances in network technology, a demand for software and systems capable of taking full advantage of these advancements is growing. In this regard, many organizations dependent on information technology are presently attempting to manage complex network environments (e.g., distributed environments) that incorporate diverse hardware, software, applications, networks, and database systems. For example, the microprocessors of devices in a distributed environment may be totally dissimilar from each other. Also, device components of distributed environments often run entirely different operating systems and are entirely independent of each other but strive to cooperate in the sharing of data. The communications protocols used by such distributed environments thus tend to be industry standards, such as Systems Network Architecture ("SNA") and TCP/IP. Still, modes of cooperation between networked devices are far from optimal.

There has been an increasing demand for software and systems capable of fully integrating and optimizing use of these disparate components. It would be desirable for these integrated systems, documents, and software to be hardware independent, support multiple users, and be based on a distributed architecture.

One particular situation where hardware independence would be desirable concerns printing via device drivers. A conventional, but inefficient, method of controlling and managing the flow of data to and from diverse input/output (I/O) devices in a distributed environment is through the use of device drivers. Device drivers are software programs that act as an interface between the device and programs that use the device. Generally, each device, such as a particular printer, has a set of specialized commands translatable by a driver for that device. In contrast, most programs access devices by using generic commands. The driver, therefore, accepts generic commands from a program and then translates them into specialized commands for the device.

Generally, peripheral input devices and peripheral output devices, such as printers, faxes, cameras, scanners, etc., interact with operating systems through the use of specific device driver software. The drivers form part of, and interact with, an operating system of a computing system. Certain basic device driver types commonly used with a personal computer, such as drivers for fixed and floppy disk drives, displays, and keyboards, are typically provided as a standard feature within the various operating systems. For many peripheral devices, however, specific drivers are created for each specific type of operating system. These specific drivers typically must be provided with a specific device driver supplied by the manufacturer of that specific input or output device. Thus, a device driver written for one operating system generally cannot be used with another operating system without extensive modifications. New peripheral devices thus require new drivers, which are installed in the operating systems in accordance with procedures specified by the particular operating system.

Universal device drivers have been created in an effort to eliminate or reduce the numerous differing device drivers required by various operating systems in running various peripheral devices. Generally, universal drivers incorporate most of the code necessary for devices in a particular class of devices (such as printers or modems) to communicate with the appropriate operating system components (such as the printer or communications subsystems). Most often, universal drivers are used in combination with mini-drivers, which contain any additional instructions needed to operate a specific device.

A second area in which the resources of a distributed environment are not efficiently utilized is in the realm of web-based image retrieval, manipulation, and utilization. Presently, systems and services exist which allow web users to extract and share various imaging information over the Internet.

On-line information systems typically include one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection as known.

The user of an on-line service uses a program on the client system to access the information managed by the on-line service. Possible user capabilities include viewing, searching, downloading, printing, and filing the information managed by the server.

There is a great need for a new development platform for distributed publishing that overcomes the various limitations described above. This need is especially pronounced and important in view of the rapid expansion of interest in the Internet.

A further area where distributed sharing and accessing of information would be beneficial concerns UNIX computing systems. UNIX computing systems comprise more than one implementation. For instance, Berkeley Software Distribution, HPUX, and AIX are three variations of the UNIX operating system. UNIX systems can be used as servers in a networked computing environment. However, sharing user-configured information in a UNIX printing environment may be problematic.

A UNIX shell typically has access to a terminal. A terminal is a device that allows a user to send commands to a computer somewhere else. UNIX is designed to work with many different kinds of terminals. Input/output commands in UNIX read and write to a virtual terminal. A terminal might be a text-based terminal (called a "tty" for short) or a graphics-based terminal (e.g., "xterm") and may vary in size. UNIX accounts for differing terminal configuration by defining terminal instances in a substantially object-oriented way. Printing from terminals may be accomplished by sending the print job via UNIX commands to a printer configured for the UNIX system. However, many users access UNIX systems by way of terminal emulators residing on personal computers having attached printers. Further, users often want to print a file that resides on the UNIX host but would rather that the print job be processed on the printer connected to the user's client machine.

To print from a UNIX terminal, the terminal communicates with the UNIX system to retrieve and format the requested information and then transmits the print job in page description language ("PDL") commands that can be executed by the printer. A "ghostscript" utility may be used to convert UNIX files into the required PDL for an attached printer, as known in the art. Ghostscript is a relatively popular utility that converts Postscript to another PDL or image format. Ghostscript may be used to print Postscript data, which is generated by many UNIX applications to the printer of choice. In addition, Ghostscript is also used to support non-Postscript printers.

Alternatively, a terminal program may be used to generate a print job, by way of a terminal printing program. Essentially, terminal printing programs encase the print data, typically converted on the UNIX system, within "print data start" and "print data stop" terminal control commands. Thus, each file to be printed is accompanied by terminal control sequences that enable or disable the local printer in a pass-through printing configuration, but this method is cumbersome and limited. For instance, terminal control sequences that control the printer status must not occur in the print data that is sent to the printer, because the command will result in the printer starting or stopping during the print data transmission. Also, printing devices and settings are limited in this configuration.

Additionally, information extracted from the UNIX system may be limited in its ability to be configured. Because terminals are typically limited in terms of functionality, printing capability is often compromised. Irrespective of UNIX system type, printing functions are limited in a UNIX environment by the functionality of the terminal as well as the limited number of printers available to the system.

Further, many UNIX systems do not provide thorough output management and report distribution for documents they generate, making it common for print jobs to be lost, with little additional control over printing. Because UNIX systems assume that the delivery of output successfully reaches its intended locations and devices, users may be at risk if delivery of output is unsuccessful. Also, cryptic and confusing command line interrogation commands are often unused by less skilled users.

The difficulty in printing from UNIX terminals has been recognized in the art. The Common UNIX Printing System ("CUPS") is a software package designed to allow users to easily print and monitor print jobs in a UNIX printing environment. CUPS provides web-based management and control of print jobs as well as network browsing for available printers. However, printing is still often limited to the output devices installed and configured for network and/or UNIX access. Although CUPS provides an improved system for managing printing in a UNIX environment, a UNIX user would benefit from the computing and output capability of the Internet. Also, if a method for utilizing the Internet for UNIX printing were available, the additional expense of printing management systems may not be necessary.

In addition, finished projects containing print jobs from different applications cannot be easily integrated prior to printing. Usually, each print job is generated by each application by way of the print driver and sent to a printer, or different printers. This method is inefficient and, furthermore, the disparate print jobs must be manually collated after printing. Although copy/paste functions of operating systems and applications somewhat alleviate this problem, it would be advantageous to assemble a single print job for printing from different applications by selecting files and previous print jobs to comprise the single print job.

Limitations and problems associated with UNIX terminals, print queues, print drivers, print job configuration and monitoring largely prevent UNIX terminal users from gaining possible benefits of high functional access to peripherals and computing power outside of a UNIX/LAN environment without additional print management systems. In addition, hardware and software independence is desirable, because networks as well as the Internet may comprise diverse computer platforms and systems.

As illustrated by the prior art, it is desirable to provide UNIX terminal printing clients with utmost functionality concerning peripherals, computing power, and imaging power available. Therefore, it would be of current interest to provide apparatus and methods for sharing imaging information between web-based services and devices in a distributed environment.

BRIEF SUMMARY OF THE INVENTION

The present invention relates generally to expanding the capability of a computing device within a UNIX printing environment to share and output image files. In contrast to the limited functionality of UNIX printing, the Internet offers the possibility of a multitude of devices and services for image sharing. However, systems for exchanging data as well as employing devices connected to the Internet are needed to exploit the resource potential available via the Internet.

The present invention relates to methods for accessing, sharing, and outputting data in a highly distributed environment. More specifically, methods providing a user with capability to store, access, edit, manage, and output data are encompassed by the present invention.

In one embodiment of the present invention, a user is able to configure image design data defining an image. Configuration information as well as image information may be saved and associated with the user as target data. Association allows for generic access instructions (not containing file location information) to cause storage or retrieval of at least one target data file. Further, at least a portion of the target data file may be stored in an independent file format.

A client may be configured with a web browser that accesses web content and a software extension which provides generic access instructions for accessing at least one target data file. "Extension", as used herein, refers to software that, among other things, responds to generic access instructions by generating generic access requests. "Generic access instructions" or "generic access requests", as used herein, denote executable instructions not containing file location information which are intended to cause a target file to be accessed or stored. Generic access instructions are processed by the extension to generate generic access requests, thus accessing at least one target data file. Multiple target data files may be stored and retrieved in response to generic access instructions. Typically, generic access instructions retrieve or store target data files to storage locations associated with a user or client based upon user information or client information obtained from the client.

In addition, upon target data file retrieval, output of the target image file may be accomplished by accessing an output device of the present invention. Selectable options are provided in accordance with the output device(s) selected. Furthermore, graphical output configuration, print preview, and print monitoring may be provided. Multiple target file output as well as multiple output device(s) may be employed to accomplish user requirements.

In further embodiments, image configuration, storage, and output may be disseminated as separate functions. Accordingly, the separate functional aspects may be commercialized. Further, the separately distributed imaging functions may be employed in combination to accomplish user requirements.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE EMBODIMENTS

Figure 1:
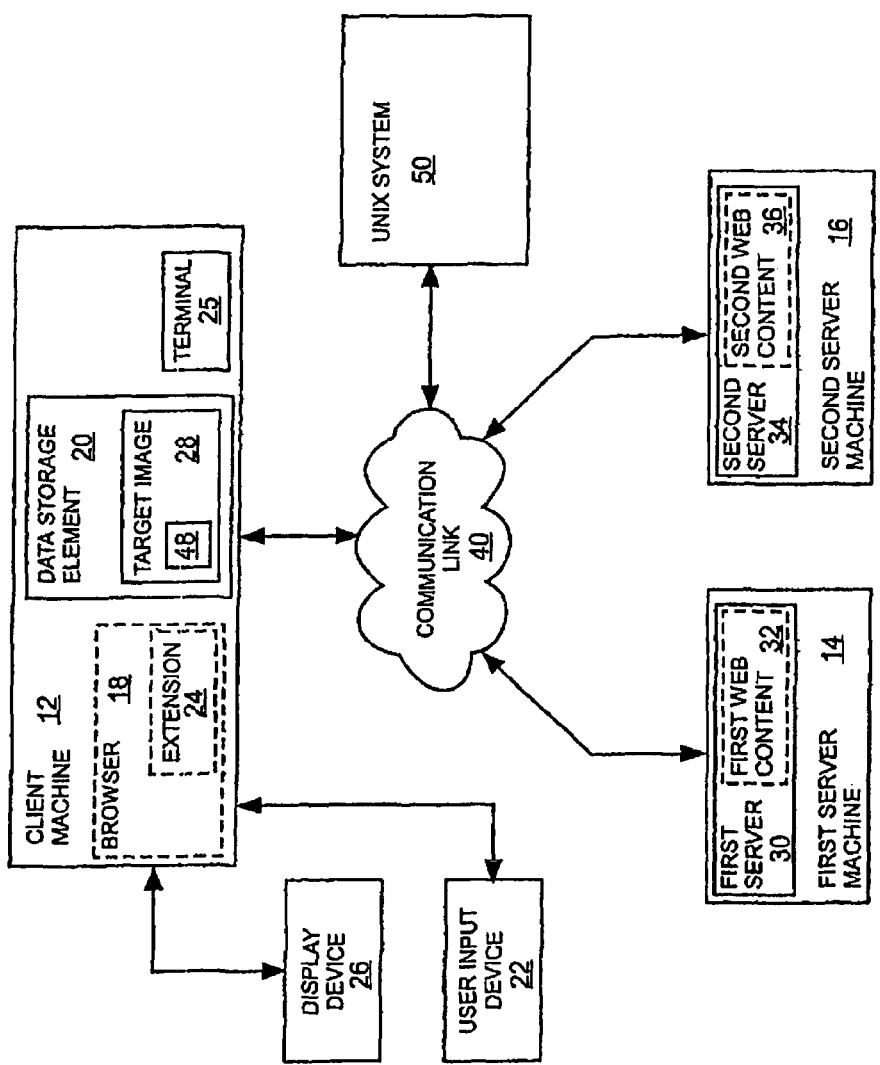
FIG. 1 is a schematic representation of a first embodiment incorporating teachings of the present invention wherein target data storage occurs in the client machine.

FIG. 1 shows a client machine 12 comprised of a display device 26 and user input device(s) 22 in a UNIX printing environment. A client machine in a UNIX printing environment is at least partially dependent on a UNIX system or terminal to configure or output print jobs. Client machine 12 communicates with UNIX system 50 via conventional communication apparatus. For instance, network interfaces, routers, and hubs may be employed to conduct communication responsibilities as part of communication link 40. This may allow for the client machine 12 to establish direct connection with other network peers, depending on the network configuration.

One embodiment of the present invention is shown in FIG. 1, wherein a personal computer client machine 12 configured with computing power and storage capability is connected to a UNIX printing environment. In addition, the client machine 12 communicates with a UNIX system 50 by way of a terminal 25.

In the present invention, the terminal 25 may include functionality designed to interact with the browser 18/extension 24 to effect storage and retrieval of a print job generated within the terminal 25. Furthermore, a print job configured within the terminal 25 may become a target image 28. In addition, the terminal 25 may include the capability of associating the most current print request with the user's default target image. Thus, the terminal 25 may be configured to interact with the distributed imaging system and method of the present invention.

A first server machine 14 includes a first server 30, which can respond to an appropriate request via communication link 40 from the browser 18 by supplying a first web content 32. Similarly, a second server machine 16 including a second server 34 can respond to a request via communication link 40 from the browser 18 by supplying a second web content 36. First web content 32 and second web content 36 include generic access instructions. Generic access instructions are executable instructions intended to cause the executing device to generate generic access requests in order to access and/or store a target image 28. However, generic access instructions and generic access requests do not include the location of a target image 28.

For instance, a user may define an image by providing input via the user input devices 22. To accomplish this functionality, the client machine 12 requests the terminal 25 to access an application or database residing within the UNIX system 50 that accepts input from a user to define an image. The image may be configured from database queries, other images, or other sources available. As an example, images from the Internet may be specified or combined with information obtained from the UNIX system 50. An "image" may include a graphical image, textual image, audio image, combined image, or other image associated with computing systems and display systems.

A user provides input (via the user input device 22) to the client machine 12 in order to define an image by way of terminal 25. The client machine 12 receives input from both the user and terminal 25 and creates a set of (user defined) design data 48 that describes the image. Next, the client machine 12 provides the user with an option to store the design data 48 and image data as a target image 28. This option may be provided to the user via a user interface displayed by the display device 26. In response to this user input, the client machine 12 identifies the design data 48 (user defined) and image data as the target image 28 for the client machine 12. As a result, upon the client machine 12 subsequently receiving generic access instructions, the client machine 12 will respond to these instructions by accessing target image 28. Thus, the target image 28 is associated with the user of client machine 12. User login or any other software or hardware may be used to associate the target image 28 with the user. As shown, the target image 28 is stored in data storage element 20. Multiple target images 28 associated with a user may be stored in data storage element 20 of the client machine 12.

In another example, a user of a networked computer system or client machine may use a software program as known in the art to log-on to a UNIX system using a communication protocol such as a TCP/IP connection. To validate log-on, the UNIX system prompts the client machine, or user, for user information that is unique to the user. For instance, the user may be prompted to enter a user name and a password before being granted access to the UNIX system. Once the user is validated and logged onto the UNIX host, the user may interact with applications residing on the UNIX host to create something that they wish to print, such as a document, a picture, or other computer generated item. Once created, the user may choose to print the creation using the UNIX print spooler as known. Upon requesting the printing of the creation, a target image, including a data file representing the creation, may be created by the UNIX system and stored to data repository associated with the user of the client machine based upon the login information provided by the user. In most instances, the target image may be created by a filter incorporated with the UNIX print queue. A filter may be defined such that upon a print request by a user, a target image of the print request content is created and saved to a data storage location associated with the unique information provided by the user during login. The unique user information may be used to provide the path for storing the target image and even additional information about the user if desired. Thus, a print request in a UNIX environment may automatically create and store a target image of the requested print job to a storage location uniquely associated with the user requesting the print job.

Therefore, when generic access instructions to store the design data 48 and image data are received, the target image 28 is stored on the client machine 12 within data storage element 20. Such a configuration may reduce processing times when retrieving images in response to generic access instructions. Storage of the target image 28 may be attained via common printing file formats such as postscript or others known in the art.

It is further contemplated that design data 48, if available, may be stored separately from image data comprising target image 28. Such a configuration may allow access to an editing function without loading the image. Furthermore, design data 48 may include enough information to completely generate the target image 28. For instance, design data 48 may specify images contained within a graphics service, or other graphics store available on the Internet. Also, design data 48 may include specific UNIX system 50 information and/or commands in order to generate a target image. Relative position (on the printing page) and other formatting information may be included in design data 48. Thus, design data 48 may completely specify target image 28 and therefore may be used to cause printing of a target image 28.

Figure 7:
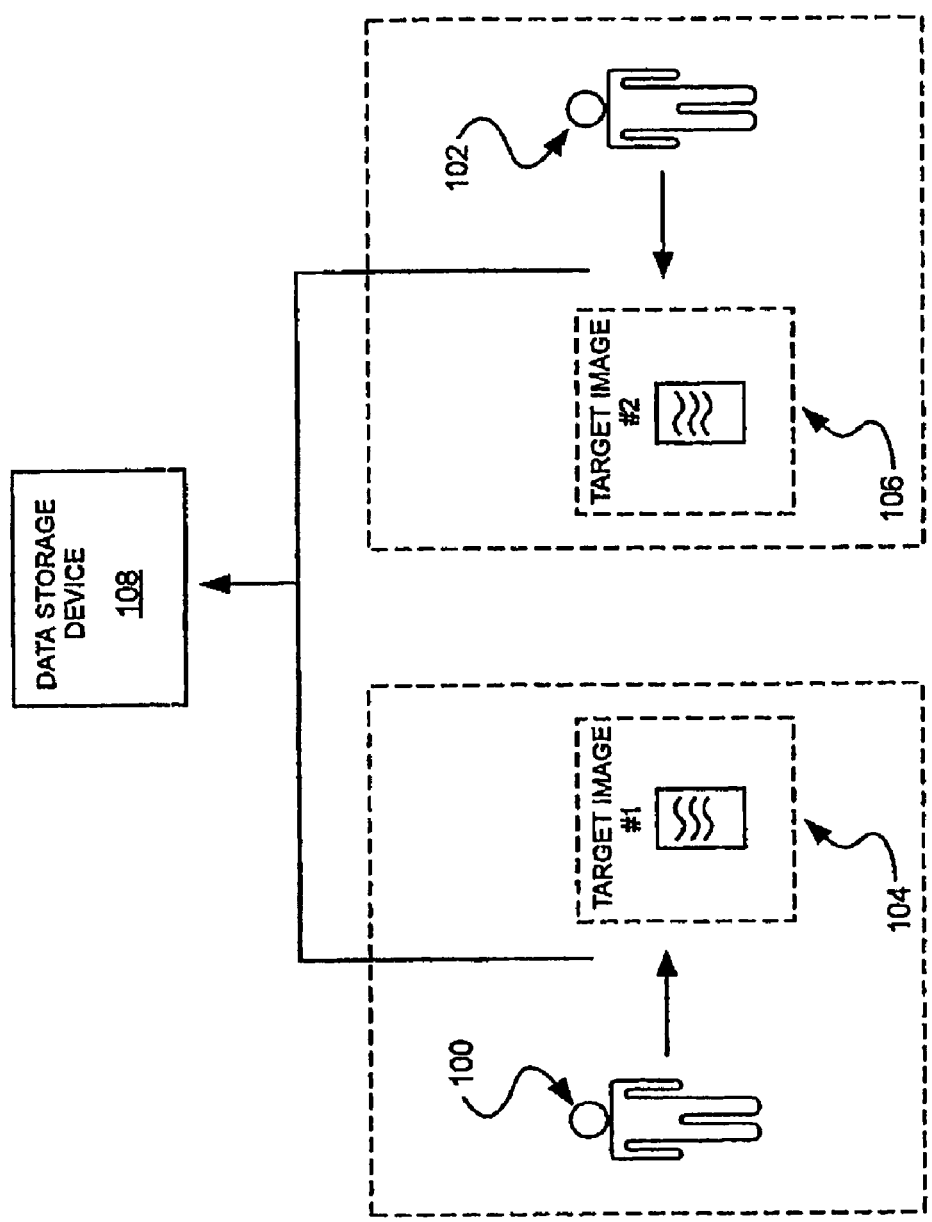
FIG. 7 is a representation of target image retrieval by two different users incorporating teachings of the present invention.

FIG. 7 depicts the association of target image 104 with user 100 and the association of target image 106 with user 102. Generic access instructions for retrieval of a target image while user 100 is using a client machine cause retrieval of target image 104, whereas generic access instructions for retrieval of a target image while user 102 is using a client machine result in retrieval of target image 106. Target images associated with different users may be stored in data storage device 108 and subsequently retrieved by the associated user. Therefore, association with a user occurs upon storage of a target image, and association information may be used to determine which target image(s), if any, may be retrieved by a user.

The target image 28 is stored in a file format that is system independent. More specifically, the file represents the image in a way that is independent of the web content employed to access the image, the local computer operating system, or the hardware used to generate the image. One example of such a format is the file format known as "PDF," which is an acronym for "Portable Document Format." This format has been designed by Adobe® for the exchange of documents on various platforms. Currently, the format is used under Windows, Macintosh and various UNIX platforms. It is essentially a final format—in contrast to SGML—based formats that are aimed to be revisable. "Final" means: it is not primarily aimed at being edited—although this is possible. Final form documents are formatted for visualization on a printer or a screen. In addition, PDF documents are object oriented, wherein each page is an object. Again, and importantly, PDF creates a file format that represents a document in a manner independent of the hardware, operating system, or software used in its creation.

In order to retrieve the stored target image 28, the user provides the browser 18 with input via the user input device 22 causing the browser 18 to transmit an appropriate request to the first server machine 14 for the first web content 32. Upon receiving the first web content 32, the browser 18 begins executing the generic access instructions included in the first web content 32. The first web content 32 includes a set of commands that includes one or more generic access instructions and additional commands for causing the display device 26 to display the image represented by the target image 28. The execution of the generic access instructions results in appropriate generic access requests being generated that cause the target image 28 to be retrieved from data storage element 20.

Although the client machine 12 may be a work station or computer system, the client machine 12 may also comprise a portable computing device, such as a personal digital assistant computing device, cellular phone, or other portable computing device. Such portable devices may "synchronize" with desktop computers to acquire target image associations, or may initiate associations independently. Further, the browser 18 and/or extension 24 may be tailored depending on the capability of the client machine 12 as well as the capability of the communication link 40. Additionally, a browser 18 may be enabled with multiple extensions that may be executed depending on the characteristics of the client machine 12, communication capability, or user preference.

Thus, a device or similar portable computing device may effectively utilize the imaging system of the present invention. However, under certain conditions, the browser 18 and/or extension 24 may be tailored to function more effectively according to the characteristics of the computing device as well as the communication conditions. For instance, on a wireless connection to a computing device with limited bandwidth and computing power, the full preview of the target image 28 may be eliminated, or substantially abbreviated. Conversely, a computer with exemplary computing and communication capability may include extensive preview, editing capability, as well as status information about the target image 28.

Browser 18 responds to the generic access instructions to retrieve the data by retrieving the target image 28 by way of extension 24. More specifically, the extension 24 generates an appropriate set of device specific commands to retrieve the target image 28 in response to the generic access instructions that are received. After the target image 28 is retrieved, the browser 18 causes the display device 26 to display the user-defined image.

The extension 24 is configured to respond to the execution of generic access instructions by generating corresponding specific commands that cause the target image 28 associated with a user as depicted in FIG. 7 to be accessed. It will be understood by a person skilled in the art that the extension 24 may be implemented by a programming interface similar to an API. Thus, the generic access instructions, when executed, may cause calls to be issued to the extension 24 in order to accomplish data access. These calls are the generic access requests generated in response to the generic access instructions. It will also be recognized that there are many other ways (both hardware and software) to implement this same functionality. The present invention is not limited to any one way.

Next, the user causes the browser 18 to transmit an appropriate request to the second server 34 for the second web content 36 in order to print the target image 28. The second server 34 responds by transmitting the second web content 36 to the browser 18. Importantly, second web content 36 includes generic access instructions for effecting the retrieval of target image 28. In addition, second web content 36 includes instructions to make use of the retrieved image to display a print dialog box 200, as shown in drawing FIG. 10, that includes a post-process image 202 (i.e., a print preview image) of the target image 28. It is emphasized that the display of the print dialog box 200 is accomplished by operation of the second web content 36 as opposed to the local operating system or the browser 18. Furthermore, the print dialog box 200 displays selectable options 204 that are based upon the capabilities of the second server machine 16. The selectable options 204 that are selected may be graphically represented within the post-process image 202 to depict the selected options. For instance, if a user selects that the print job should be stapled from selectable options 204, a graphical depiction of a staple 216 appears in the upper left-hand corner of the post-process image 202 of the target image 28, as shown in drawing FIG. 10.

After the user configures and requests printing by selecting the print button 210 of the print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16 to be printed.

Importantly, the second web content 36 downloaded in browser 18 is further configured to transmit appropriate requests to the second server machine 16 in order to determine the print job status. Requests and responses are transmitted on a periodic basis to effectively update the print job status. When a response is received indicating the print job status has changed, the second web content 36 causes the client machine 12 to display this information.

Figure 3:
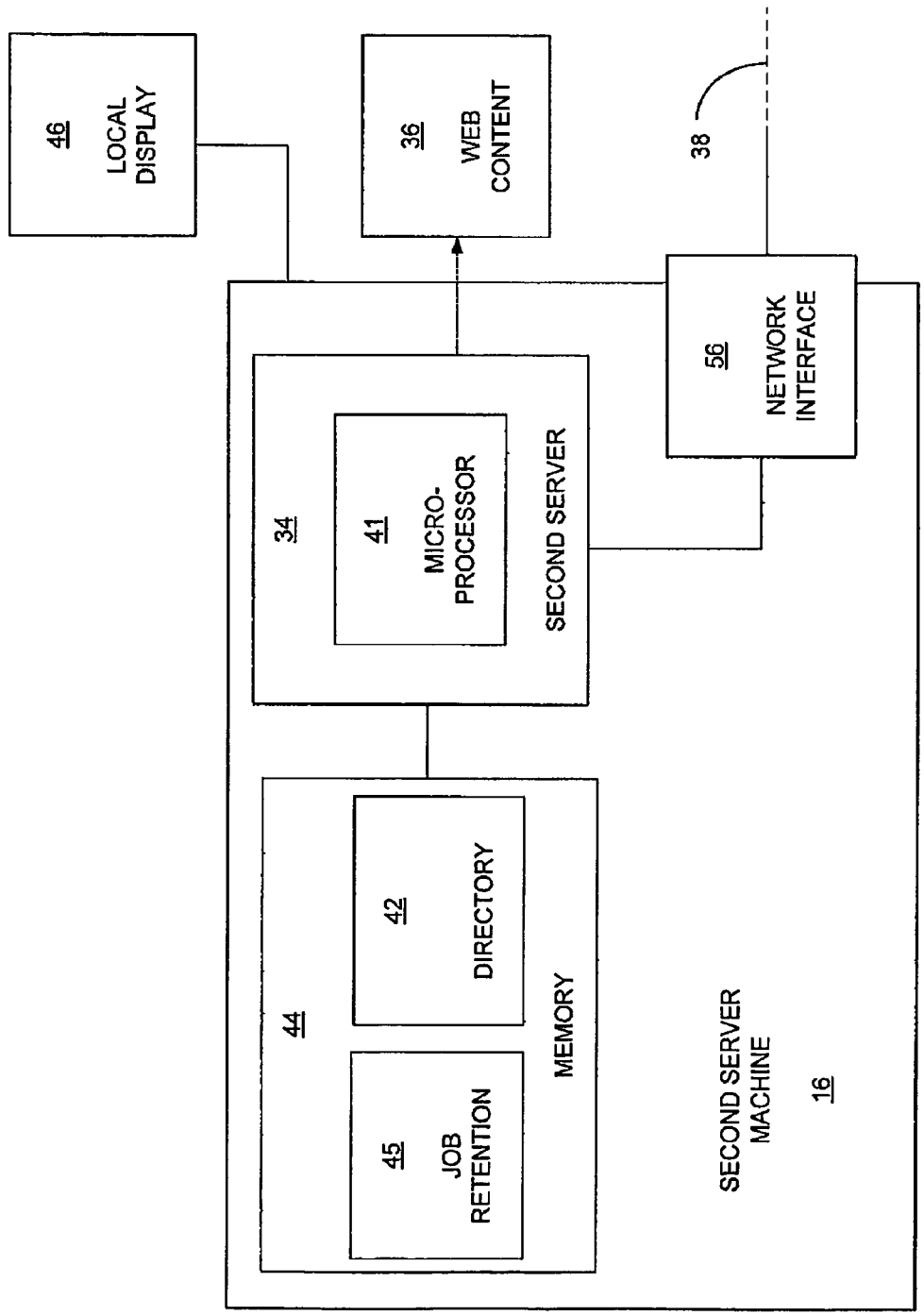
FIG. 3 is a schematic representation of a second server machine depicted in FIGS. 1-2 incorporating teachings of the present invention.

Referring to drawing FIG. 3, one embodiment of a second server machine 16 for carrying out the methods of the present invention is shown. Second server machine 16 is configured with both an embedded web interfacing system (e.g., a server 34) for enabling access and interaction with other devices linked to local and external communication networks, including the web, a LAN, a WAN, an intranet, the computer network of an on-line service, etc., and printer-specific hardware and software. The printer-specific hardware and software of second server machine 16 may be provided in any conventional printer configuration known in the art, including those associated with laser printers, impact printers, photographic printers, and inkjet printers. Second server machine 16 may include one or more local displays 46, which may comprise a conventional monitor, a monitor coupled with an integrated display, an integrated display (e.g., an LCD display), or other means for viewing print queues, print attributes, and associated data or processing information, including printer-specific information. Second server machine 16 also includes a network interface 56 for bi-directional data communication through one or more of the various networks (LAN, WAN, Internet, etc.) using communication paths or links known in the art, including wireless connections, ethernet, bus line, Fibre Channel, ATM, standard serial connections, and the like.

Second server 34 provides one or more web server functions to requesting users linked by way of one or more of the various networks (LAN, WAN, Internet, etc.). The second server machine 16 of the present invention may thus be the same as or conceptually similar to the printer apparatus configured with an embedded web server described in U.S. Pat. No. 5,956,487 to Venkatraman et al., assigned to the assignee of the present invention, the disclosure of which is incorporated by reference herein in its entirety. In addition, output may include printing, audio, and video representations, or musical representations of the target image(s).

Still referring to drawing FIG. 3, the embedded second server 34 of the present invention includes a microprocessor 41 responsible for controlling all aspects of second server 34. Thus, microprocessor 41 is configured to process communication protocols and executable programs associated with second server 34 which are stored in ROM (not shown) and/or hard disk memory 44. In an embodiment, second server 34 uses microprocessor 41 and the ROM-stored protocols to exchange data with other devices/users on one or more of the networks via HTTP and Simple Mail Transfer Protocol (SMTP), although other protocols such as File Transfer Protocol (FTP), Simple Network Management Protocol (SNMP), and Gopher document protocol may also be supported. Second server 34 is further configured to send and receive HTML-formatted files.

Microprocessor 41 is configured to perform some or all of the printer-specific functions of second server machine 16, including control of printer-specific hardware and software. Microprocessor 41 is provided with memory 44 in the form of RAMM, and/or ROM, and/or hard disk memory. As used herein, memory 44 designated for temporarily or permanently storing one or more print jobs or other data storage device in second server machine 16 is referred to as job retention 45. A percentage of memory 44 in second server machine 16 may be dedicated to second server 34. Alternatively, second server 34 may share the available memory 44 in second server machine 16 with job retention 45. Typically, second server machine 16 will be equipped with a minimum of 64 megabytes of RAM, although less RAM may be used in certain configurations.

Second server machine 16 may contain executable software programs stored in memory 44 related to the operation of second server 34. Memory 44 may also contain printer-specific software programs relating to the operation of printer-specific hardware. Alternatively, a separate hard disk (not shown) may optionally be provided with the requisite software programs for printing.

Using microprocessor 41, associated software, and internal circuitry of second server machine 16, second server 34 supports one or more control operations that relate to the function of second server machine 16. Second server 34 is configured to support the complete set of printing operations of second server machine 16, including access, control, and operation of printing target image 28.

In accordance with the present invention, memory 44 may contain at least one directory 42, which stores at least one interactive application configured for accessing and managing print jobs stored in job retention 45 of second server machine 16. The at least one interactive application may also, or alternatively, be stored in a directory associated with separate memory dedicated to second server 34.

In addition to being linked to a LAN or WAN, second server machine 16 may be linked directly to the Internet via network interface 56 and communication link 38 attached thereto. Embedded second server 34 within second server machine 16 is provided with at least one URL, by which it is identified over a network, and which can be accessed via HTTP, for example, from a remotely located workstation over a LAN, WAN, or the internet. Additional URLs may be provided for components of second server machine 16 that have differing functions. At least one interactive application may be stored in memory 44 of second server machine 16. The at least one interactive application includes graphical user interface control panel options, menus, and/or links for accessing and managing print jobs found in second server machine 16.

In one embodiment of the interactive application, browser 18 downloads and displays the requested second web content 36 and requests the source file of the at least one interactive application from the second server 34 via communication link 38. Second server 34 processes the request, retrieves the at least one interactive application from memory 44, and transmits the at least one interactive application to browser 18, where it is downloaded and then executed by a platform residing on the client machine 12, or embedded within the browser 18 software.

Java is the name of one very well-known and popular object-oriented computer programming language that is used to develop software applications. Java's popularity stems in part from its relative simplicity and the fact that Java is written in a manner that allows different computers (i.e., platforms) to execute the same Java code. In other words, Java is platform-independent. This feature has caused the use of Java to greatly increase with the growing popularity of the Internet, which allows many different types of computer platforms to communicate with each other. Small Java programs called "applets" are written to accomplish specific tasks. For example, the interactive application may be downloaded to the client machine 12 in Java computer programming language. At a minimum, the Java Virtual Machine platform residing on the client machine 12 comprises at least a Java-enabled browser, and a Java interpreter to run Java programs. Upon closing a session with the at least one interactive Java application, the downloaded Java application is usually configured to be automatically removed from RAM memory of the client machine 12 in order to free up resources for other applications.

Thus, from the foregoing, it can be seen that the second web content 36 enables a device to display a print dialog box 200 that includes selectable options 204. The print dialog box 200 may be formulated via a Java applet or other application that is downloaded by or resides within browser 18 or extension 24. The selectable options 204 are based upon the capabilities of the second server machine 16. In addition, the second web content 36 causes a device to display a post-process image 202 using the target image 28. The post-process image 202 is again based upon the capabilities of the second server machine 16. Further, the second web content 36 displays the status information as the print job is processed.

Although second server machine 16 has been depicted in a printing embodiment, other embodiments are contemplated. For instance, second server machine 16 may be primarily for display, where a web server is embedded into a television, videoconference equipment, a slide projector, computer monitor, or other device capable of graphically displaying the image. Further, second server machine 16 may possibly serve a primarily audio function, where the image is interpreted and then transformed into sound representations. Text may be "read" by the second server machine 16. Musical representations may be interpreted and then "played" by the second server machine 16. Alternatively, second server machine 16 may generate a holographic representation of the image data. Any combination of second server machine 16 functions described above may be employed in any fashion to create the desired output.

Figure 2:
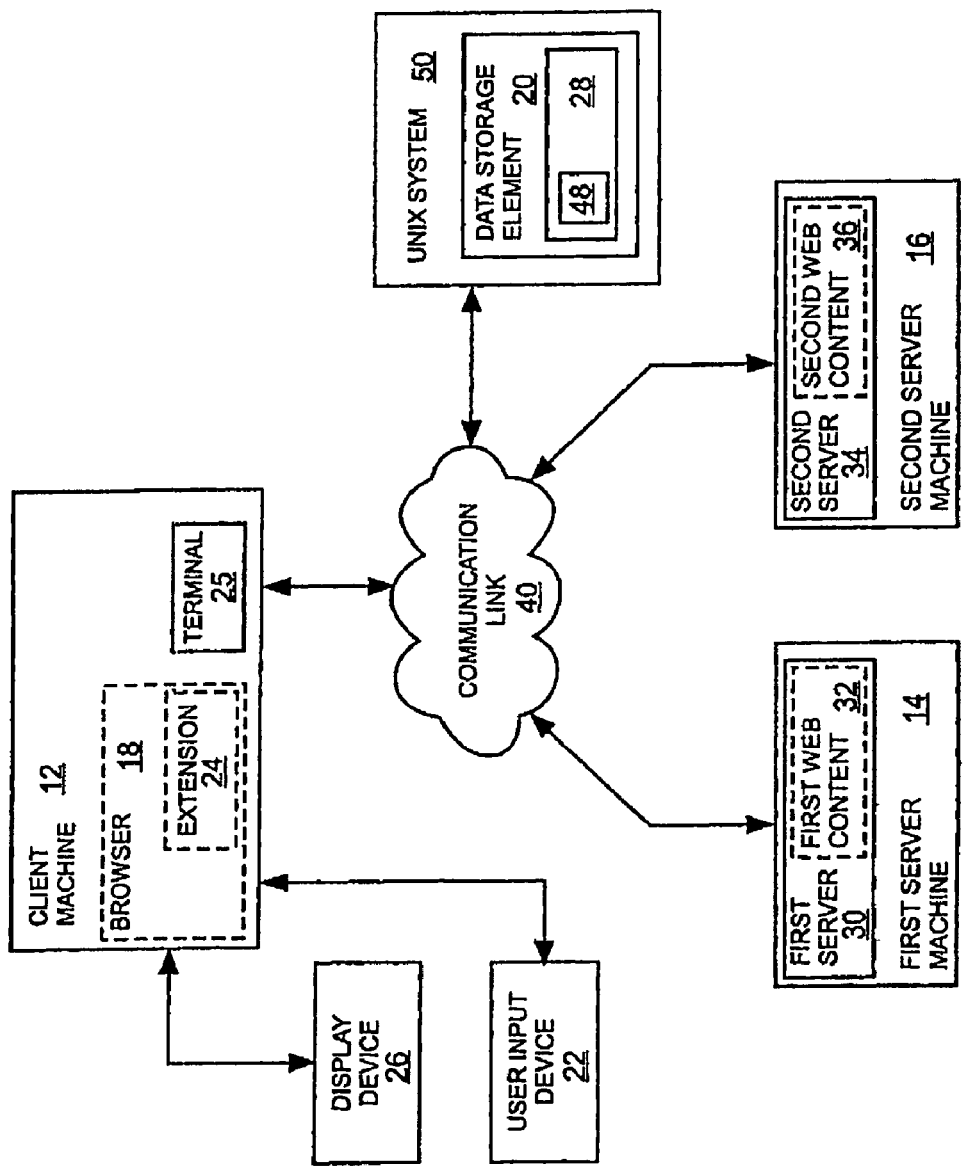
FIG. 2 is a schematic representation of a second embodiment incorporating teachings of the present invention wherein target data storage occurs in the UNIX system.

In an alternate embodiment of the present invention, shown in drawing FIG. 2, the UNIX system 50 is configured to store target image 28. In this embodiment, a user provides input (via the user input device(s) 22) to the client machine 12 in order to define design data 48 that describes the user-defined image. Next, the user selects to store the design data 48 and image data as a target image 28. This option may be provided to the user via a user interface displayed by the display device 26. Alternatively, the design data 48 may be stored as target image 28 automatically at the time a user requests the design data 48 to be printed using a printing filter or other executable code. This automatic method for preserving design data 48 as target images 28 preserves all of a user's print jobs for later retrieval should the need or desire to access the target images 28 arise. In response to the user input or print request, the design data 48 (user defined) and image data are stored as the target image 28 in data storage element 20. The target image 28 may be stored in a file format that is system independent, as discussed earlier, such as "PDF" format.

Consequently, upon the client machine 12 subsequently receiving generic access instructions, extension 24 will respond to these instructions by accessing target image 28. Thus, the target image 28 is the target data associated with the user of client machine 12. Therefore, generic access instructions would access a different target image 28 if a different user utilized client machine 12. User login or any other software or hardware means may be used to associate the target image 28 with the user. Multiple target images 28 may be stored in data storage element 20.

Next, the user provides the browser 18 with input via the user input device 22, causing the browser 18 to transmit an appropriate request to the first server machine 14 for a first web content 32. Upon receiving the first web content 32, the browser 18 begins executing the access instructions included in the first web content 32. The first web content 32 includes a set of commands also including one or more generic access instructions and additional commands for causing the display device 26 to display the image represented by the device's associated design data 48 and image data. The execution of the generic access instructions results in appropriate generic access requests being generated that cause the target image 28 to be retrieved from data storage element 20 of the UNIX system 50.

The client machine 12 responds to the generic access instructions to retrieve the target image 28 by way of extension 24. The extension 24 is configured to respond to the execution of generic access instructions by generating corresponding commands that cause the target image 28 associated with the client machine 12 to be accessed. Specifically, the extension 24, implemented via API or other means, generates a set of commands to retrieve the target image 28 in response to the generic access instructions from a storage location associated with the client machine or user of the client machine. After the target image 28 is retrieved, the browser 18 causes the display device 26 to display the user-defined image.

In order to print the target image 28, the user causes the browser 18 to transmit an appropriate request to the second server 34 for the second web content 36. The second server 34 responds by transmitting the second web content 36 to the browser 18. The second web content 36 includes generic access instructions for effecting the retrieval of target image 28, if necessary.

Figure 10:
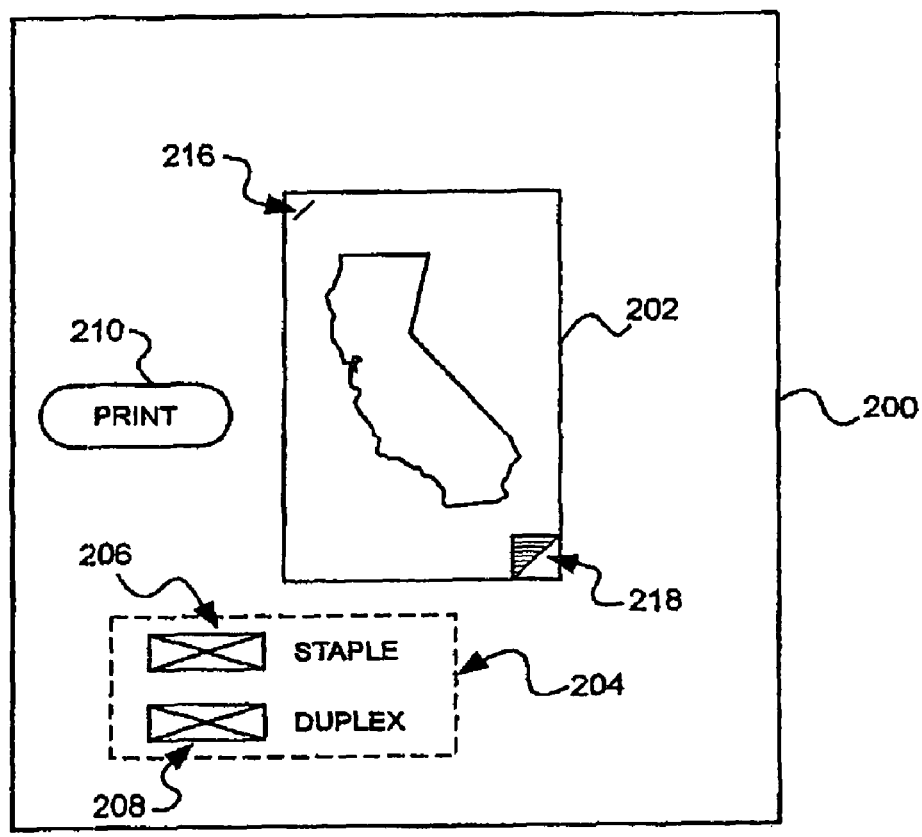
FIG. 10 is a representation of a printer dialog box incorporating teachings of the present invention.

In addition, the second web content 36 includes instructions to make use of the retrieved image to display a print dialog box 200 that includes a post-process image 202 of the target image 28. The display of the print dialog box 200, shown in FIG. 10, is via the second web content 36 as opposed to the local operating system or the browser 18. The print dialog box 200 configuration depends on the printing capability of the second server machine 16. Therefore, the print dialog box 200 displays selectable options 204 that are based upon the capabilities and characteristics of the second server machine 16. The status of selectable options 204 may be graphically represented within the post-process image 202 to depict the selected options. For instance, if a user selects that the print job should be printed in duplex mode from selectable options 204, a graphical depiction of a folded corner 218 with printing on the second side of the page appears in the lower right-hand corner of the post-process image 202 of the target image 28. Likewise, a graphical depiction of duplex selection 208, such as a marked box, may further evidence the print configuration selected by the user.

After the user configures and requests printing via print button 210 or other means provided by print dialog box 200, the second web content 36 causes the client machine 12 to generate a print job. The print job describes the target image 28 and includes the appropriate commands to cause the second server machine 16 to print the target image 28. The second web content 36 further causes the client machine 12 to transmit the print job to the second server machine 16 to be printed. Importantly, the second web content 36 is further configured to transmit appropriate requests to the second server machine 16 in order to determine the print job status. Requests and responses are transmitted on a periodic basis to effectively update the print job status. When a response is received indicating the print job status has changed, the second web content 36 may transmit the information to the client machine 12 to display this information.

The second web content 36 also enables a client machine 12 to display a print dialog box 200 that includes selectable options 204. The print dialog box 200 may be invoked via a Java applet or other application that is downloaded or resides within the extension 24. The selectable options 204 are based upon the capabilities of the second server machine 16. In addition, the second web content 36 causes the client machine 12 to display a post-process image 202 from the target image 28. The post-process image 202 is again based upon the capabilities of the second server machine 16. Further, second web content 36 displays updating status information as the output is processed.

Figure 4A:
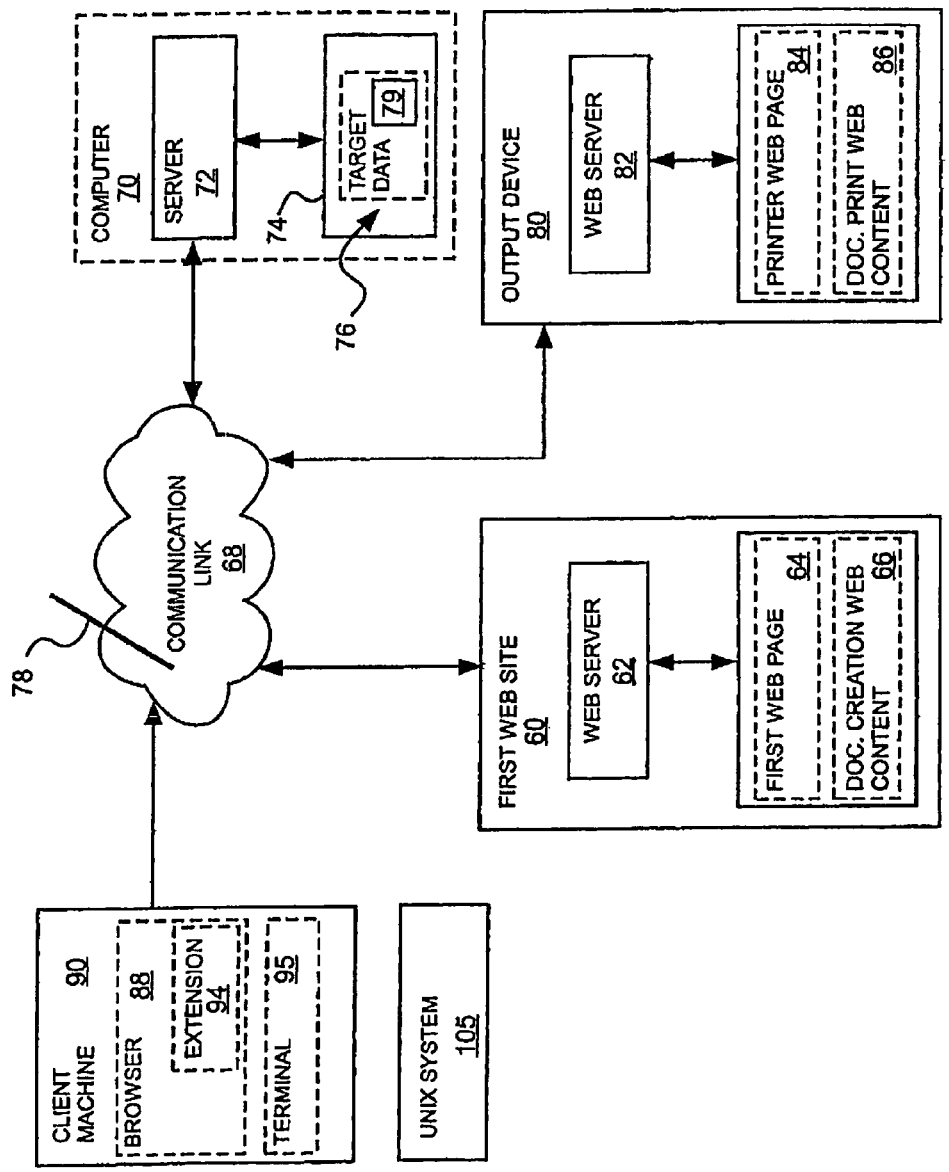
FIGS. 4A and 4B are schematic representations of a system incorporating target images as produced by the present invention.
Figure 4B:
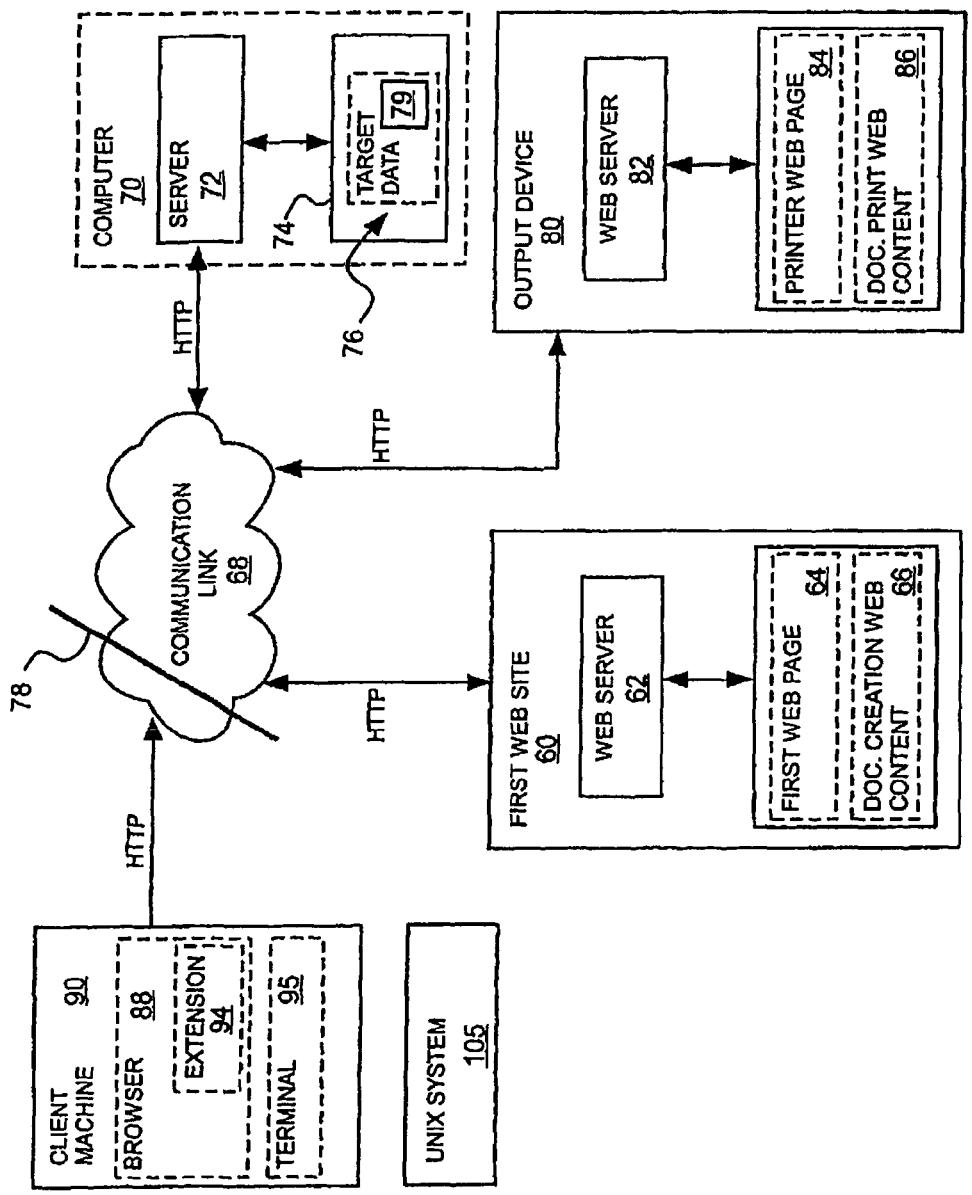

One example for using target images 28 created by the present invention is shown in drawing FIG. 4. The example includes a client machine 90 in a UNIX printing environment. Client machine 90 executes browser 88 upon request from a user of the client machine 90. Browser 88 sends communications through communication link 68 to communicate with other devices. Firewall 78 may be utilized, depending on communication configuration, and includes a conventional proxy server that allows client machine 90 to communicate with other devices. Firewall 78 may also filter out unwanted communication packets.

Figure 9:
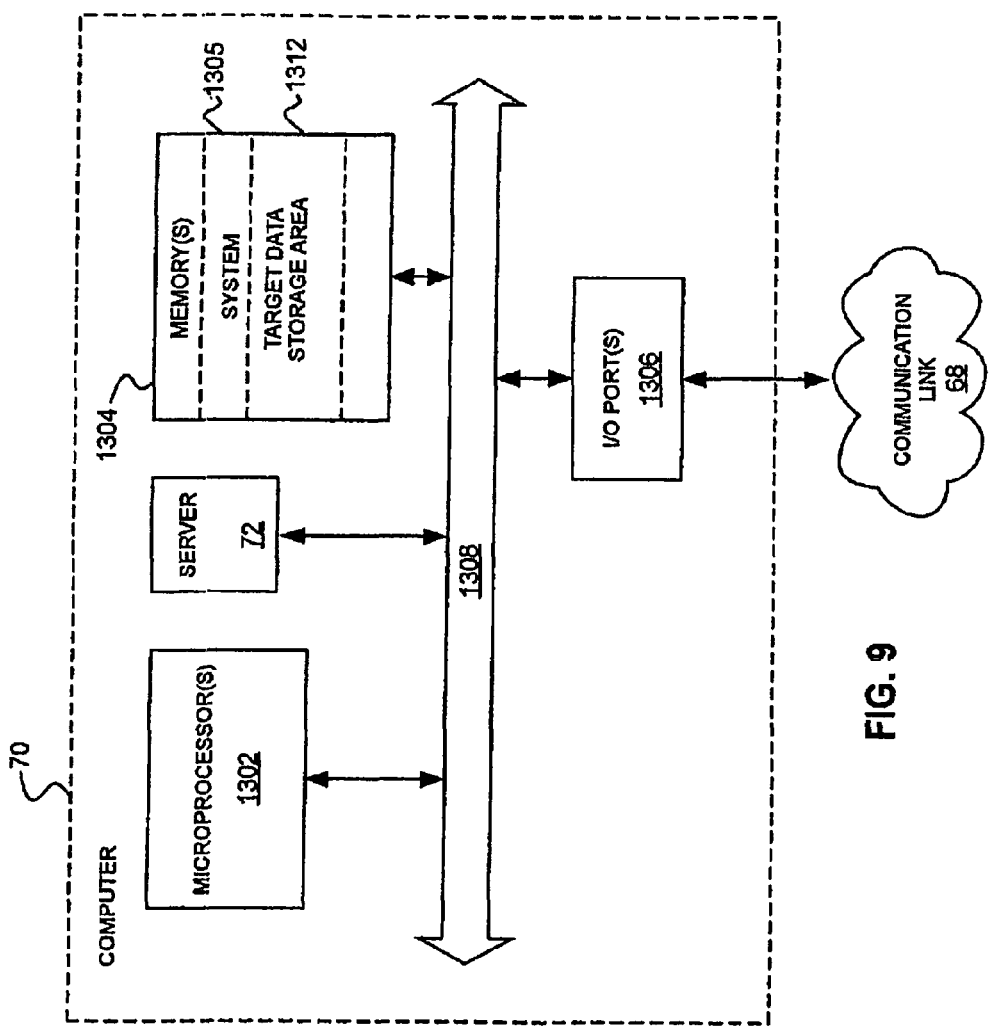
FIG. 9 is a representation of computer shown in FIG. 4.

Computer 70, depicted in drawing FIG. 9, includes a microprocessor 1302, memory 1304, a local interface(s) 1308, and I/O port(s) 1306. Memory 1304 is further comprised of system memory 1305 and target data storage area 1312. Target data storage area 1312 may store target data ("target data") 76, composed of design data 79 and image data. Local interface(s) 1308 facilitate communication between the internal circuitry and devices of computer 70 as well as communication link 68 via the I/O port(s) 1306.

Figure 6:
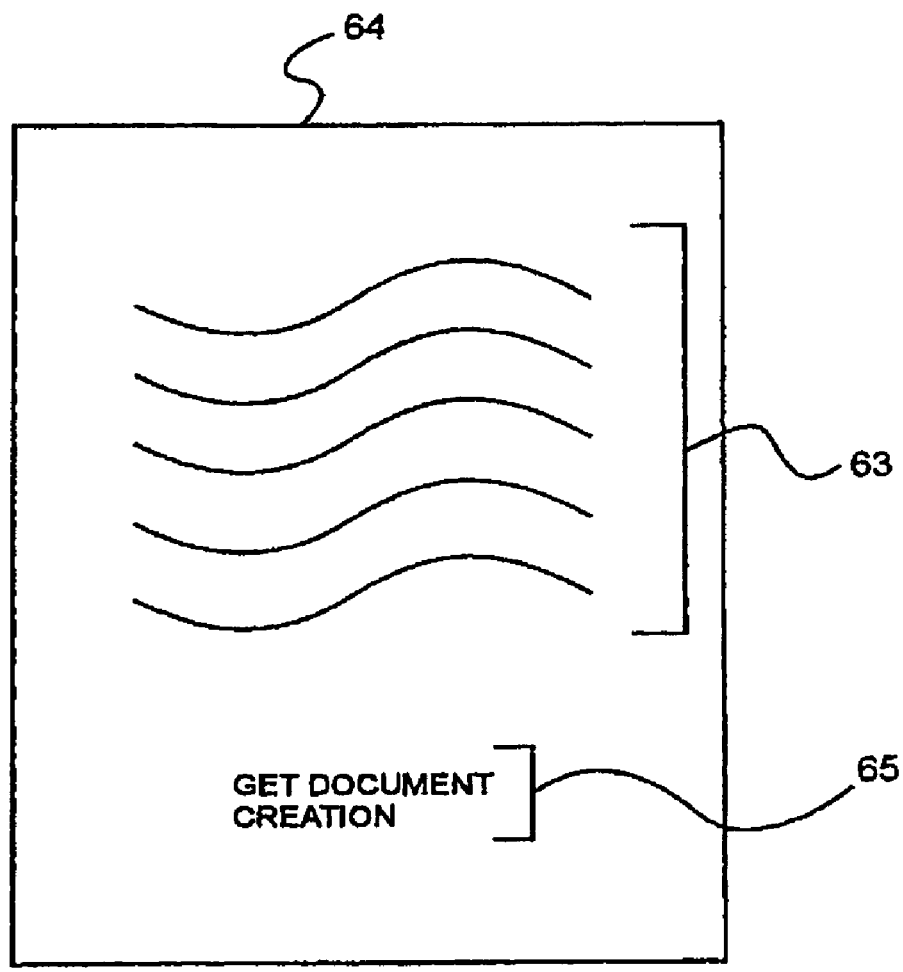
FIG. 6 is a representation of first web page shown in FIG. 4.

Upon a user's request, browser 88 accesses a first web site 60, containing a web server 62, a first web page 64, and a document creation web content 66. First web page 64, as shown in drawing FIG. 6, contains a text portion 63 as well as a document creation hyperlink 65 to the document creation web content 66 shown in drawing FIG. 4A. Upon selection of the document creation hyperlink 65, the document creation web content 66 allows a user to configure an image. The image may be obtained from previous or current sessions of the terminal 95. Alternatively, the image may be a print job generated by the terminal 95. The data describing the image may be formatted in a way that is device independent, such as PDF format, as previously described.

The terminal software may include functionality designed to interact with the browser 88/extension 94 to effect storage and retrieval of the print job generated within the terminal 95. In addition, the terminal software may include the capability of associating the most current print request with the user's default target image. Thus, the terminal 95 may be configured to interact with the distributed imaging system and method of the present invention.

For instance, different applications may be used to generate individual pages of device-independent output. As previously described, terminal 95 and Unix System 105 may be used to configure images. Then, individual pages may be combined or edited to configure an image. Other images may be added or accessed via external web sites, web pages, or online services. Alternatively, files may be selected from the local storage of the client machine 90 or other storage elements accessible to the client machine 90.

The document creation web content 66 also provides a method for a user to save image data as well as the design data 79 as target data 76, which is associated with the particular user of the client machine 90. Upon user request to store target data 76, document creation web content 66 generates generic access instructions in order to cause the design data 79 generated by the user to define the image as well as the image data to be stored as target data 76. Target data 76 is associated with the user. Association may be accomplished by user login information, or other identification means.

Association of target data 76 occurs upon storage, and a user may store multiple sets of target data. Any set of previously stored target data 76 that is associated with the user requesting retrieval may be accessible. Furthermore, the user may specify default target data 76. Default images may be automatically retrieved upon generic access instruction generation via web content. Alternatively, a menu or other selection process may be employed to specify desired target data 76.

Extension 94 responds to the generic access instructions generated by the document creation web content 66 and causes the target data 76 to be stored in the storage area 74 of a computer 70. Extension 94 communicates the target data 76 over communication link 68 to computer 70. Alternatively, communications may be effected via both communication link 68 and firewall 78 to transfer target data 76 to server 72 of computer 70. Importantly, if firewall 78 is employed for communication between extension 94 and computer 70, a suitable firewall friendly protocol, such as HTTP, is used to transfer target data 76 to server 72 of computer 70 and to storage area 74. Thus, printing may be accomplished by HTTP across the Internet. It is important to note that, in other embodiments of the invention, other communication protocols (either now existing or yet to be developed) may be used.

Depending on the communication connection configuration of first web site 60, computer 70, and output device 80, communications may be realized via communication link 68 and possibly firewall 78, if needed. Communications may be accomplished via conventional means, such as I/O ports, network interface cards, or other communication devices. Further, communication link 68 may comprise routers, repeaters, hubs, cluster controllers, or other communication means known in the art.

Document creation as depicted and described hereinabove may be commercialized as a document creation service, available to users in communication with shown devices. Information and payment means may be included in first web page 64.

Figure 5:
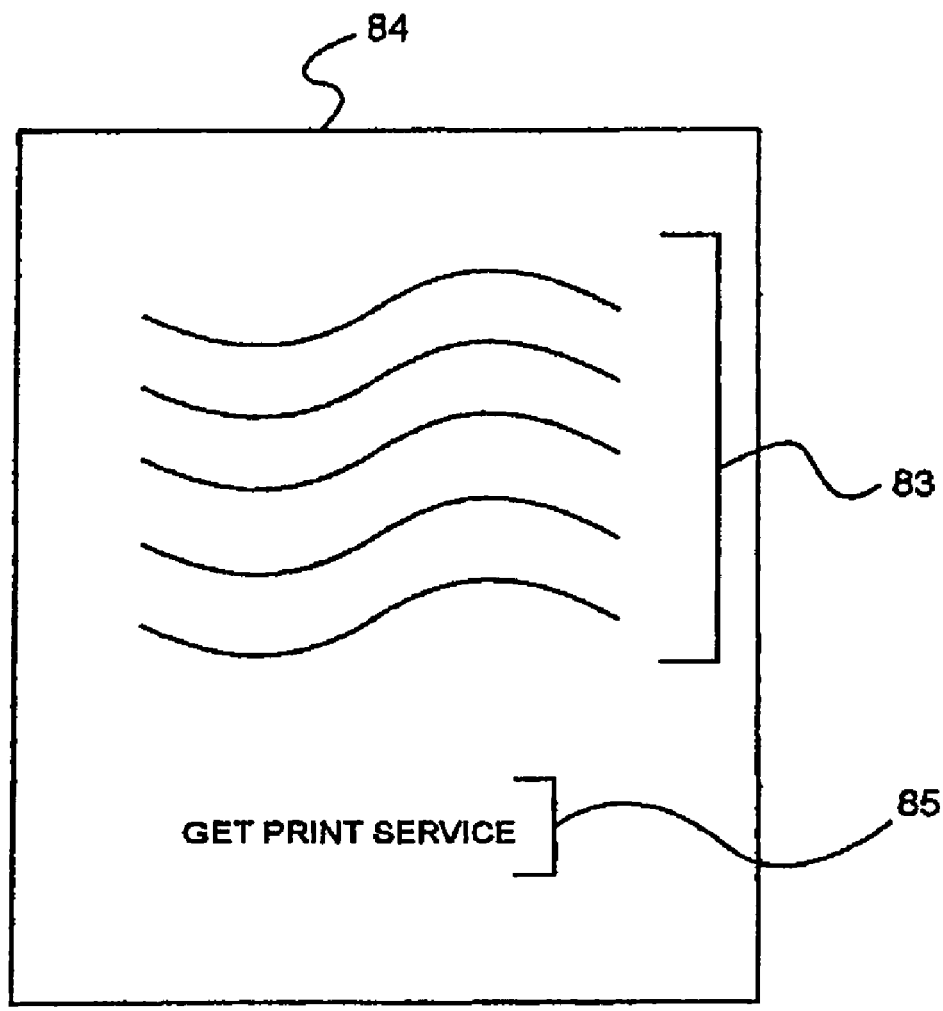
FIG. 5 is a representation of printer web page shown in FIG. 4.

Subsequent to document creation, a user may also print from the target data 76. A user of client machine 90 executes browser 88 and inputs the URL of the printer web page 84, thus requesting printer web page 84. Web server 82 of the output device 80 responds to the request by transmitting the printer web page 84 to the browser 88, which displays printer web page 84 on the client machine 90. The printer web page 84 includes a text portion 83 as well as a get document print service hyperlink 85, as shown in drawing FIG. 5. Upon the user selecting the get document print service hyperlink 85, the document print web content 86 is requested by the browser 88 and transmitted by web server 82. Document print web content 86 contains generic access instructions, which cause extension 94 to generate generic access requests in order to retrieve target data 76 from computer 70. Generic access requests for retrieval may contain a file format for the retrieved data. The desired file format may be different from the originally stored file format of target data 76. Thus, the retrieval generic access requests communicate the desired file format to server 72 and server 72 provides the target data 76 to extension 94 in the desired format. Accordingly, generic access requests including file format specifications may be tailored depending on the capability of the client machine 90, output device 80, as well as the capability of the communication link 68.

A document print service, such as that depicted and described herein may be commercialized as a printing service, available to accessible users. Information and payment means may be included in printer web page 84.

Further, the browser 88 and/or extension 94 may be tailored depending on the capability of the client machine 90, and output device 80, as well as the communication capability of the communication link 68 to the client machine 90. Additionally, a browser 88 may be enabled with adaptable extensions or extension functionality that corresponds to the characteristics of the client machine 90, communication capability, output device 80, or user preference. For instance, image quality may be altered to correspond with communication capabilities of the client machine 90. Alternatively, target data 76 may be converted or otherwise altered to improve an aspect of printing to output device 80.

Figure 8:
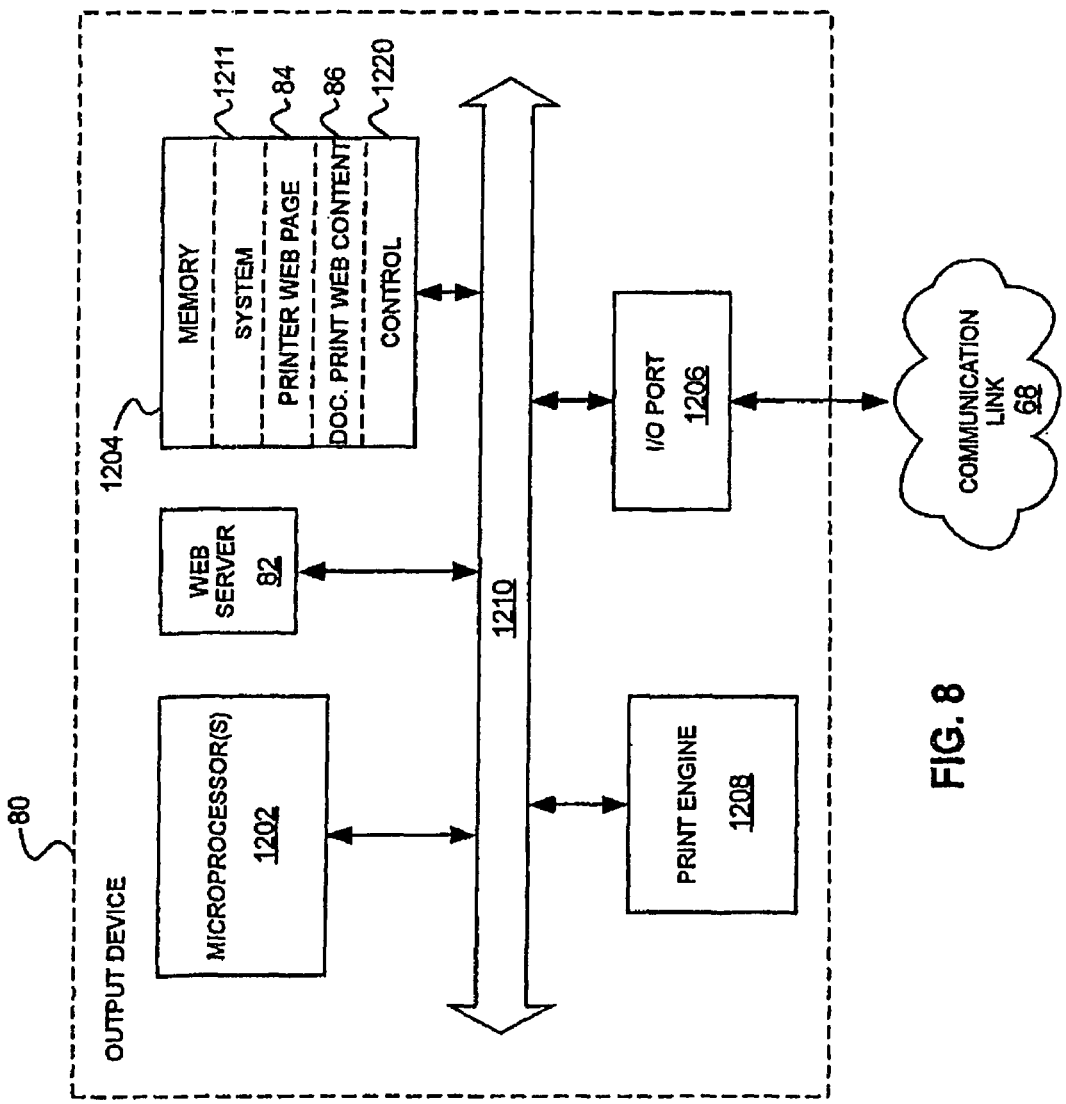
FIG. 8 is a representation of output device shown in FIG. 4.

Referring to drawing FIG. 8, output device 80 is configured with an embedded web server 82 for enabling access and interaction with other devices linked to local and external communication networks, including the web, a LAN, a WAN, an intranet, the computer network of an on-line service, etc., and the print engine 1208. Output device 80 is also configured with a microprocessor 1202 which executes the instructions of web server 82, including processing communication protocols and executable programs associated with web server 82 which are stored in ROM (not shown) and/or memory 1204. Memory 1204 may comprise system memory 1211, printer web page 84 document print web content 86, and printer control program 1220.

The print engine 1208 of output device 80 may be provided in any conventional configuration known in the art, including those associated with laser printers, impact printers, photographic printers, and inkjet printers.

In an embodiment, second server 82 uses microprocessor 1202 and the ROM-stored protocols to exchange data with other devices/users on one or more of the networks via HTTP and SMTP, although other protocols such as FTP, SNMP, and Gopher document protocol may also be supported. Web server 82 is further configured to send and receive HTML-formatted files.

Microprocessor 1202 is configured to perform some or all of the printer-specific functions of output device 80, including control of printer-specific hardware and software as well as print engine 1208. Microprocessor 1202 is provided with memory 1204 in the form of RAM, and/or ROM, and/or hard disk memory. As used herein, the portion of memory 1204 designated for temporarily or permanently storing one or more print jobs or other data storage device in output device 80 is referred to as job retention 1245 (not shown). In one embodiment, a percentage of memory 1204 in output device 80 may be dedicated to web server 82.

Output device 80 may also contain executable software programs stored on memory 1204 related to the operation of web server 82. Memory 1204 may also contain printer-specific software programs relating to the operation of print engine and/or printer-specific hardware. Alternatively, a separate memory capability (not shown) may optionally be provided with the requisite software programs for printing.

Using microprocessor 1202, printer control software 1220, and internal circuitry of output device 80, web server 82 supports one or more control operations that relate to the function of output device 80. Web server 82 is configured to support the complete set of printing operations of output device 80, including access, control, and operation of printing in conjunction with printer control software 1220.

In accordance with the present invention, memory 1204 may contain at least one directory which stores at least one interactive application configured for accessing and managing print jobs stored in job retention 1245 (not shown) of output device 80. The at least one interactive application may be stored in memory 1204.

In addition to being linked to a LAN or WAN, output device 80 may be linked directly to the Internet via I/O port(s) 1206 and communication link 68 attached thereto. Local interface (s) 1210 facilitate communication between the internal circuitry and devices of output device 80 as well as communication link 68 via I/O port 1206. Embedded web server 82 within output device 80 is provided with at least one URL, by which it is identified over a network, and which can be accessed via HTTP, for example, from a remotely located workstation over a LAN, WAN, or the Internet. Additional URLs may be provided for components of output device 80 that have differing functions, as depicted by printer web page 84 and document print web content 86.

The output device 80 comprises a web server 82 providing one or more web server functions to requesting users linked by way of one or more of the various networks (LAN, WAN, Internet, etc.). The output device 80 of the present invention may thus be the same as or conceptually similar to the printer apparatus configured with an embedded web server described in U.S Pat. No. 5,956,487 to Venkatraman et al., assigned to the assignee of the present invention.

Upon retrieval of target data 76, document print web content 86 includes instructions to make use of the retrieved image to display a print dialog box 200, shown in FIG. 10, that includes a post-process image 202 (i.e., a print preview image) of the target data 76. It is emphasized that the display of the print dialog box 200 is by operation of the document print web content 86. Furthermore, the print dialog box 200 displays selectable options 204 that are based upon the capabilities of the output device 80. The selectable options 204 that are selected may be graphically represented within the print dialog box 200 and/or the post-process image 202. For instance, if a user selects that the print job should be stapled, a graphical depiction of a staple 216 may appear in the upper left-hand corner of the post-process image 202 of the target data 76. In addition, a graphical depiction of staple selection 206 may appear in the print dialog box 200.

After the user configures and requests printing by selecting print button 210 or other means provided by print dialog box 200, the document print web content 86 causes the client machine 90 to generate a print job. The print job describes the target data 76 and includes the appropriate commands to cause the output device 80 to print the target data 76. The document print web content 86 further causes the client machine 90 to transmit the print job to the output device 80 to be printed. Importantly, the document print web content 86 downloaded in browser 88 is further configured to transmit appropriate requests to output device 80 in order to determine the print job status. Requests and responses are transmitted on a periodic basis to effectively update the print job status. When a response is received indicating the print job status has changed, the document print web content 86 may cause the client machine 12 to display this information.

Although browser 88/extension 94 have been described as processing one set of target data 76 to one output device at a time, multiple print jobs and output devices may be employed. The present invention contemplates that printer web page 84 may be configured to accept and manage multiple target data set requests to multiple output devices. For instance, printer web page 84 may be configured to accept at least one URL address of another desired output device. The user enters the desired output device(s) and selects the get document print service hyperlink 85, and the document print web content 86 is configured to respond to the user request. In one embodiment, the document print web content 86 is able to interrogate the available output devices and graphically represent each output device's selectable options as well as update each print job as it is processed by each output device. Alternatively, multiple browser applications could be executed in separate windows and managed separately by the user as described in the present invention.

In addition, if multiple target data sets are available to a user, menus may be provided to the user as part of the document print web content 86 along with corresponding output device URLs. Therefore, the user could select a target data set from any available target data sets and prescribe a destination URL (and thereby an output device) for that target data set. Thus, the present invention contemplates multiple target data set output. Further, the present invention contemplates multiple output device selection. Even further, the present invention contemplates multiple target data sets in combination with multiple output device selection.

Also, the output device 80 may further distribute the print job. For example, if a user requests twenty copies of a certain target data 76 to be printed, the output device may distribute the print job to multiple output devices to accomplish printing. Five of the original twenty copies of the desired target data 76 may be sent to four appropriate output devices for printing. Thus, a distributed printing environment utilizes output capability in a more efficient manner than typical serial printing in a UNIX printing environment.

Although the foregoing description contains many specifics, these should not be construed as limiting the scope of the present invention, but merely as providing illustrations of some possible embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A method for printing a target image in a printing environment that includes a client machine, the method comprising:
    identifying the target image as data to be accessed in response to an execution by the client machine of at least one generic access instruction that does not identify a location of the target image;
    obtaining first web content by way of said client machine, the first web content containing the generic access instruction for causing the target image to be accessed; and
    obtaining second web content from a printer incorporating a web server by way of said client machine, the second web content comprising instructions for generating a print dialog box with at least one selectable printing option of the printer and instructions for causing the client machine to transmit a print job generated for the target image to be printed according to the selectable printing option.

2. The method of claim 1, wherein said identifying the target image to be accessed comprises associating the target image with a computer user and specifying a default target image associated with said computer user.

3. The method of claim 1, wherein at least a portion of any said obtaining includes obtaining through a firewall.

4. The method of claim 1, wherein the target image is stored in an independent image format.

5. A system for sharing data in a printing environment comprising:
- a client machine;
- a target image identified as data to be accessed in response to a generic access instruction that does not identify a location of the target image;
- a software extension executable by the client machine and configured access the target image in response to the generic access instruction;
- first web content containing the generic access instruction;
- second web content having instructions for causing the client machine to display a print dialog box with at least one selectable printing option for a printing device and instructions for causing the client machine to transmit a print job generated for the target image to be printed according to the selectable printing option; and
- a printing device configured to output the print job, the printing device including a web server configured to serve the second content.

6. The system of claim 5, wherein the generic access instruction of the first web content causes said software extension to access the target image.

7. The system of claim 5, wherein the target image represents an image in an independent format.

8. The system of claim 5, wherein said software extension causes the target image to be output by way of said printing device including said web server.

9. The method of claim 1, wherein said printer incorporating a web server is operating in a UNIX printing environment.

10. The method of claim 1, wherein identifying the target image includes saving the target image to a path associated with a user.

* * * * *